United States Patent
Husted et al.

(10) Patent No.: US 8,144,811 B2
(45) Date of Patent: Mar. 27, 2012

(54) HYBRID ZERO-IF RECEIVER

(75) Inventors: Paul J. Husted, Santa Clara, CA (US); Shahram Abdollahi-Alibeik, Santa Clara, CA (US); David J. Weber, Santa Clara, CA (US); Soner Ozgur, Santa Clara, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 872 days.

(21) Appl. No.: 12/016,955

(22) Filed: Jan. 18, 2008

(65) Prior Publication Data

US 2008/0181284 A1 Jul. 31, 2008

Related U.S. Application Data

(60) Provisional application No. 60/886,910, filed on Jan. 26, 2007.

(51) Int. Cl.
*H03K 9/00* (2006.01)
(52) U.S. Cl. ........ 375/316; 375/319; 375/340; 375/346; 375/350
(58) Field of Classification Search .................. 375/316, 375/319, 340, 346, 350
See application file for complete search history.

(56) References Cited

U.S. PATENT DOCUMENTS

| | | | |
|---|---|---|---|
| 5,946,607 A * | 8/1999 | Shiino et al. ............... 455/234.1 |
| 6,373,909 B2 * | 4/2002 | Lindquist et al. ............. 375/346 |
| 6,665,355 B1 * | 12/2003 | Chen et al. .................... 375/321 |
| 6,801,585 B1 | 10/2004 | Nguyen et al. |
| 7,103,316 B1 | 9/2006 | Hall |
| 7,116,963 B2 | 10/2006 | Suominen |
| 7,684,464 B2 | 3/2010 | Linsky et al. |
| 7,711,027 B2 | 5/2010 | Honda |
| 7,808,950 B2 | 10/2010 | Kizu et al. |
| 2002/0065060 A1 * | 5/2002 | Minnis et al. ................. 455/324 |
| 2002/0160734 A1 * | 10/2002 | Li et al. ....................... 455/245.1 |
| 2003/0067359 A1 | 4/2003 | Darabi et al. |
| 2003/0100286 A1 * | 5/2003 | Severson et al. .............. 455/324 |
| 2004/0063403 A1 | 4/2004 | Durrant |
| 2005/0159109 A1 | 7/2005 | Kivekas et al. |
| 2005/0191964 A1 | 9/2005 | Hundal |
| 2005/0220219 A1 | 10/2005 | Jensen |
| 2006/0013172 A1 | 1/2006 | Ruuska et al. |
| 2007/0098118 A1 * | 5/2007 | Muhammad et al. ......... 375/344 |
| 2010/0291921 A1 | 11/2010 | Ruuska et al. |

FOREIGN PATENT DOCUMENTS

EP 1404072 A1 3/2004

OTHER PUBLICATIONS

Mitra et al. Digital Signal Processing: A Computer-Based Approach, The McGraw-Hill Companies, Inc, 1998, pp. (220-228).*
International Search Report and Written Opinion—PCT/US2008/051831, ISA/US, May 23, 2008.

* cited by examiner

*Primary Examiner* — Kabir A Timory
(74) *Attorney, Agent, or Firm* — Bever, Hoffman & Harms, LLP

(57) ABSTRACT

An apparatus for processing a Bluetooth signal advantageously mixes down a received RF signal to an IF signal wherein one band-edge of the spectrum of the IF signal may be approximately 0 Hz. In one embodiment, the IF signal may be digitized, decimated and filtered before being processed into a baseband signal. The baseband signal may be processed by a cordic (COordinate Rotation DIgital Computer) processor to transform the baseband signal from rectangular to polar coordinates. A phase signal from the cordic processor may be used to determine transmitted Bluetooth data symbols. The apparatus may advantageously use less area than traditional Bluetooth receivers.

18 Claims, 4 Drawing Sheets

HYBRID ZERO-IF RECEIVER

CROSS-REFERENCE TO RELATED APPLICATIONS

This application claims benefit of U.S. provisional patent application entitled "Hybrid Offset Zero-IF Receiver", Ser. No. 60/886,910, filed Jan. 26, 2007, which is herein incorporated by reference.

BACKGROUND OF THE INVENTION

1. Field of the Invention

Embodiments of the present invention generally relate to radio receivers, and more particularly to hybrid zero-IF receivers.

2. Description of the Related Art

Wireless communication systems may transfer data from a transmitter to one or more receivers using modulated radio frequency (RF) signals. Bluetooth systems are wireless communication systems governed, in part, by the Bluetooth Special Interest Group (SIG). Bluetooth system may transfer data at 1, 2, or 3 Mb/s, depending on, in part, the modulation method used to encode data symbols.

FIG. 1 is a block diagram of a prior art Bluetooth receiver 100. The Bluetooth receiver 100 includes an antenna 110, a variable gain amplifier (VGA) 120, a mixer 125, a band-pass filter 130, an analog automatic gain controller (AGC) 140 and an analog phase detector 150. Bluetooth signals occupy the 2401 through 2481 MHz range of frequencies. Bluetooth devices use frequency hopping as a form of a multiple access scheme. Each frequency band is 1 MHz wide and is used by users for a predetermined amount of time. Bluetooth signals are received by the antenna 110, and may be amplified by the VGA 120. The mixer 125 typically mixes the amplified signal with a frequency signal to produce a baseband signal. The baseband signal is provided to the band-pass filter 130, which is typically configured to remove out of band signal content from the baseband signal. The filtered signal is coupled to the analog phase detector 150 and the analog AGC 140. The analog phase detector 150 determines the transmitted data symbols from the baseband signal. In some embodiments, the analog phase detector 150 may be replaced with multi-bit analog-to-digital converters (ADCs). Data from the multi-bit ADCs may be examined to determine the transmitted data symbols. The analog AGC 140 may adjust the gain of the VGA 120 such that the amplified signal may not distort and may have a relatively high signal-to-noise ratio.

Such traditional low-IF (intermediate frequency) Bluetooth receivers operate with an architecture that typically includes band-pass filtering requiring either complex analog circuits or heavy DSP processing. Moreover, the enhanced data rates (EDR) of Bluetooth version 2.0 and 2.1 as specified by the Bluetooth SIG use phase-shift keying (PSK) modulation schemes to support 2 Mbs and 3 Mbs of data throughput. These modulation schemes may require more complex analog filters or an analog differential phase detector, which may further complicate the design of a Bluetooth receiver. As is well-known, complex analog circuit designs are relatively difficult to execute, generally require more area and power than relatively simpler analog designs and may be prone to accept noise from nearby circuits.

Therefore, what is needed is a Bluetooth receiver design with relatively simple analog filter design requirements that can support the extended data rates of Bluetooth v2.0 and v2.1.

SUMMARY OF THE INVENTION

Relatively simpler analog filter design requirements may be achieved by digitizing RF signals with an oversampling analog-to-digital converter (ADC). Further processing of the signal may be performed in the digital domain, which is relatively less prone to noise sensitivity and may be easily implemented with digital circuits.

One method for processing a Bluetooth signal receives an RF signal and mixes the RF signal with a first frequency to produce an intermediate frequency (IF) signal such that one band-edge of the related frequency spectrum of the IF signal is approximately 0 Hz. The IF signal may be further processed to recover transmitted symbols.

In one embodiment, the IF signal may be filtered by a first low-pass filter. The output of the first low-pass filter may be digitized by an analog-to-digital converter (ADC) to produce a digital IF signal. In one embodiment, the ADC may be implemented with two ADCs, one each for I and Q components. The ADC may oversample the IF signal. In one embodiment, the sampling frequency of the ADC may be 64 MHz and each component may be represented by two bits.

The digital IF signal may be filtered by a second low-pass filter configured to limit energy of the digital IF signal. This filter removes some quantization noise due to the ADC as well as other blocking signals at relatively nearby frequencies. The output of the second low-pass filter may be decimated by a first decimator. In one embodiment, the output of the second low-pass filter may be decimated by four to produce a signal with a 16 MHz sampling rate. The output of the first decimator may be low-pass filtered with a third low-pass filter to further reduce quantization noise from the ADC. The output of the third low-pass filter may be decimated by a second decimator. In one embodiment, the second decimator may decimate the output of the third low-pass filter by two to produce a signal with an 8 MHz sampling rate.

The output of the second decimator may be examined for a DC component. The DC component may be removed from the output of the second decimator to produce a corrected IF signal. The corrected IF signal may be mixed down to baseband by a second mixer. Further processing of a Bluetooth signal may depend on the modulation of the Bluetooth signal.

If the baseband signal is GFSK modulated, then the baseband signal may be further filtered and transformed from rectangular coordinates to polar coordinates (i.e., magnitude and phase). The phase signal may be examined to recover transmitted symbols.

If, on the other hand, the baseband signal is PSK modulated (i.e., EDR signals), then the baseband signal may be filtered by a pulse shaping filter and a fourth low-pass filter. The output of the fourth low-pass filter may be transformed from rectangular coordinates and the phase signal may be examined to recover transmitted symbols.

DETAILED DESCRIPTION

Figure 2:
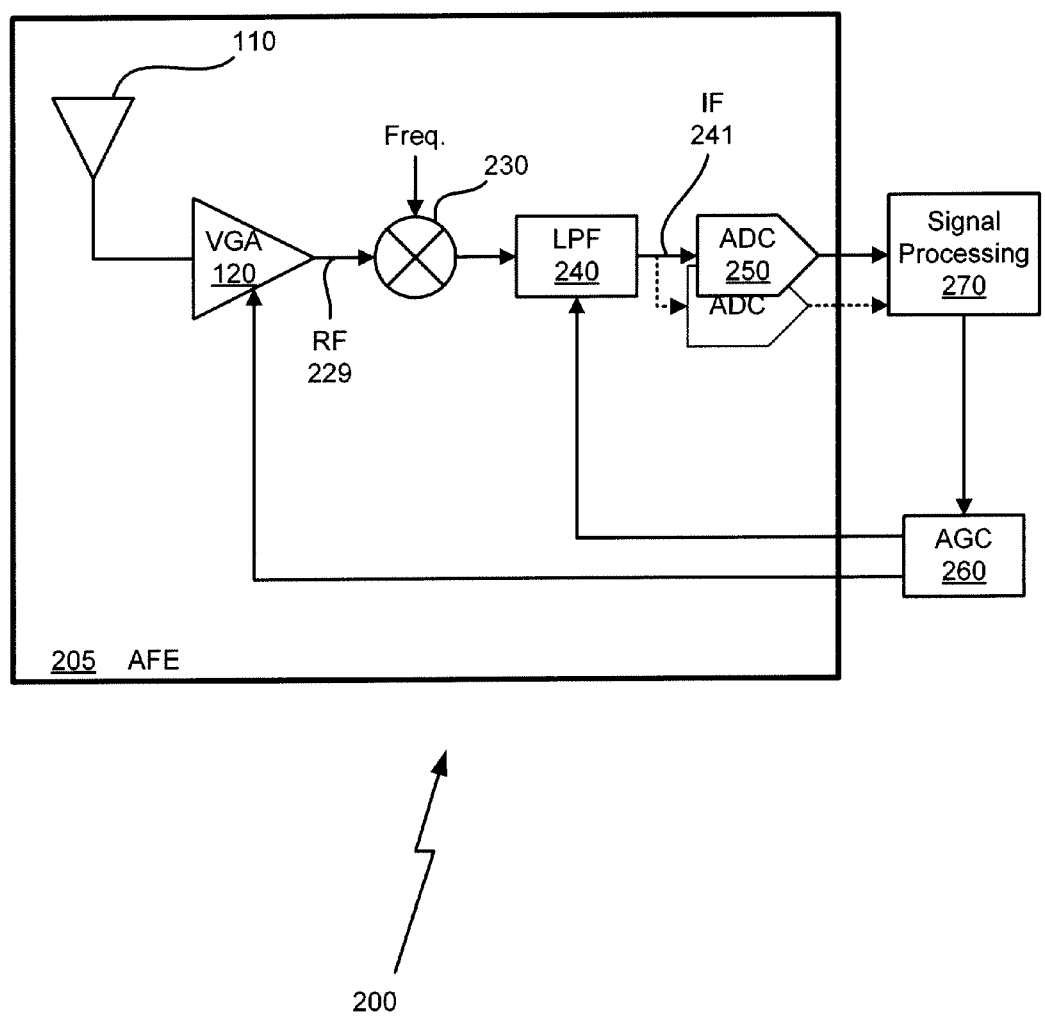
FIG. 2 is a block diagram of a hybrid zero-IF Bluetooth receiver.

FIG. 2 is a block diagram of an exemplary hybrid zero-IF Bluetooth receiver 200 with a relatively simple analog filter design and minimal space requirements that can advantageously support extended data rates. The Bluetooth receiver 200 may include an analog front end (AFE) 205, an automatic gain controller (AGC) 260 and a signal processing unit 270. The AFE 205 may be configured to receive and digitize RF signals and the signal processing unit 270 may be configured to process signals provided by the AFE 205 and recover transmitted symbols.

The AFE 205 includes an antenna 110, a VGA 120, a first mixer 230, a low-pass filter (LPF) 240, and an ADC 250. The antenna 110 may receive RF signals such as Bluetooth signals. Bluetooth devices utilize frequency hopping from a first band to a second band as a form of a multiple access scheme. As described herein, each frequency band is 1 MHz wide. In one embodiment, the AFE 205 may be implemented with two signal paths that may operate in quadrature. In such an embodiment, the first mixer 230, the low-pass filter 240 and the ADC 250 may be replaced with a mixer, a low-pass filter and an ADC for each signal path. For example, a mixer, a low-pass filter and an ADC may be used for the direct signal path, while another mixer, another low-pass filter and another ADC may be used for the quadrature signal path.

The antenna 110 is coupled to the VGA 120. The antenna 110 provides received RF signals to the VGA 120 which may provide a variable amount of gain to the received RF signal. The VGA 120 is coupled to the first mixer 230. The first mixer 230 may be configured to mix the processed RF signal 229 from the VGA 120 with a first frequency down to approximately 500 KHz producing a first signal such that one band edge of the frequency spectrum of the first signal is approximately 0 Hz. As described above, the output of the first mixer 230 may produce I and Q quadrature components.

The output of the first mixer 230 is coupled to the first low-pass filter 240. The first low-pass filter 240 may amplify and filter the I and Q components provided by the first mixer 230. In one embodiment, the first low-pass filter 240 may be implemented with an active analog filter. In one embodiment, the first low-pass filter 240 may be a first-order low-pass filter and have a cutoff frequency of about 3 MHz and may include an amplifier configured to provide gain from 10 to 24 dB in 1 dB steps. The first low-pass filter 240 is coupled to the ADC 250. The ADC 250 may digitize the filtered signal (i.e., an IF signal 241) provided by the first low-pass filter 240, thereby producing a digital IF signal. In one embodiment, the ADC 250 may be implemented with a 2-1 cascaded $\Sigma\Delta$ ADC. Moreover, the ADC 250 may be implemented with two ADCs, one for each I and Q component. Any distortions or interferers at the ADC sampling frequency that may alias after sampling may be removed by the first low-pass filter 240. In one embodiment, the sampling rate of the ADC 250 may be 64 MHz and the output of the ADCs may be quantized to 2-bits (i.e., 2-bits for each I and Q components). In one embodiment, the input of the ADC may include a 2-tap low-pass filter that may place a notch in the IF signal to reduce the magnitude of the first alias image at the sampling frequency.

The output of the ADC 250 is coupled to the signal processing unit 270. Operation of the signal processing unit 270 is described in greater detail in conjunction with FIG. 3. The signal processing unit 270 is coupled to the AGC 260. The outputs of the AGC 260 may be coupled to the VGA 120 and the LPF 240. The AGC 260 may examine signals from the signal processing unit 270 and may determine an amount of gain for the VGA 120 and the LPF 240. For example, the signal processing unit 270 may provide a signal to the AGC 260 indicating an amount of overflow or underflow that may be associated with the output of the ADC 250.

Some Bluetooth signals may have a transfer rate of 1 Mb/s and may be modulated with a form of Gaussian frequency-shift keying (GFSK). EDR Bluetooth signals may have higher transfer rates and may use PSK (phase-shift keying) modulation techniques. The different modulation techniques may require different processing procedures. However, the signal processing unit 270 may be designed so that portions of the datapath are common for both types of signals and may be re-used whenever possible.

Figure 3:
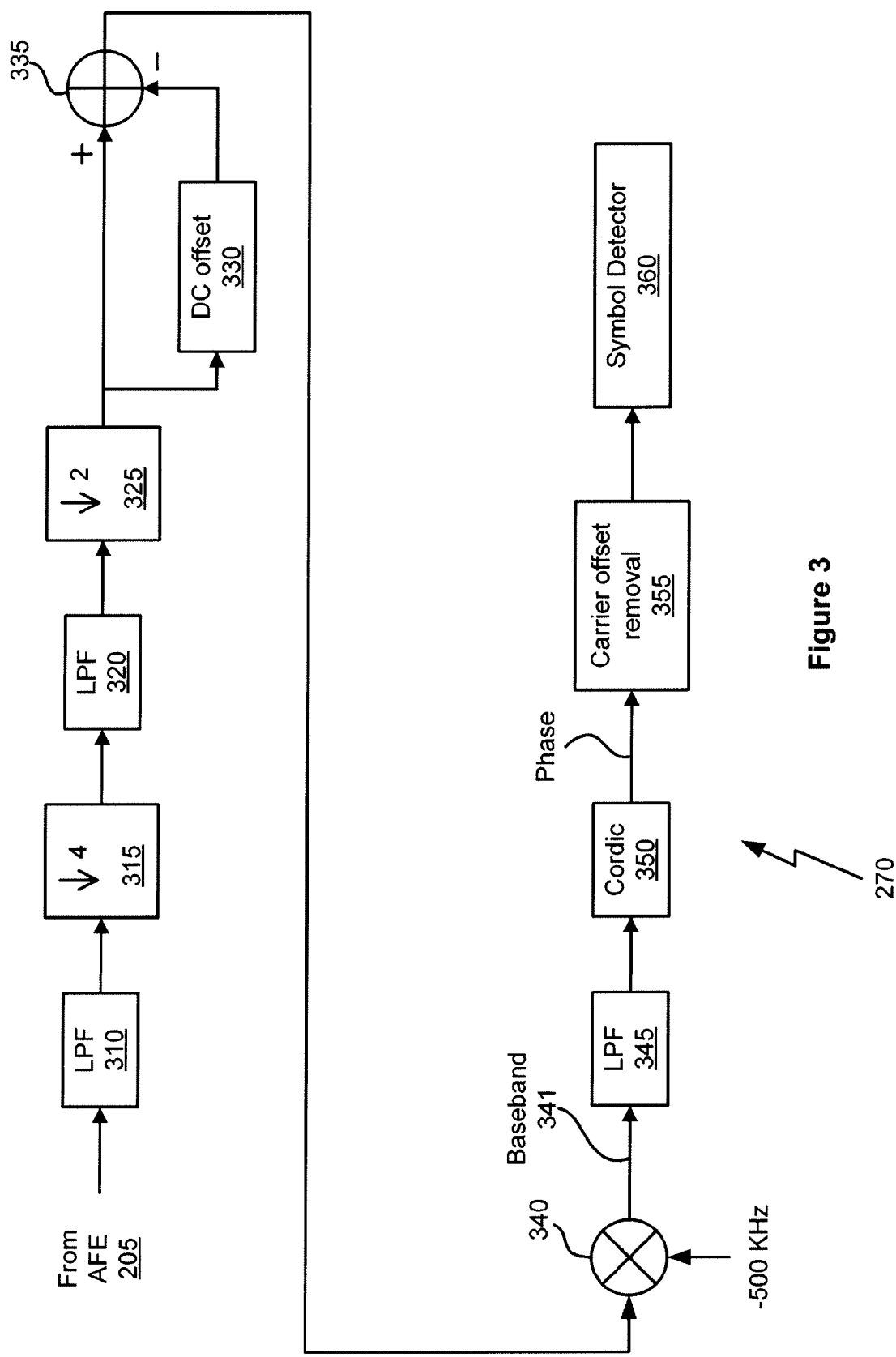
FIG. 3 is a block diagram of the signal processing unit of FIG. 2 configured to process GSFK modulated signals; and,
FIG. 4 is a block diagram of the signal processing unit of FIG. 2 configured to process PSK modulated signals.

FIG. 3 is a block diagram of the signal processing unit 270 of FIG. 2 configured to process GSFK modulated signals. In this configuration, the signal processing unit 270 includes, without limitation, a second low-pass filter 310, a first down-sampler 315, a third low-pass filter 320, a second down-sampler 325, a DC offset estimator 330, an adder 335, a second mixer 340, a fourth low-pass filter 345, a cordic processor 350, a carrier offset removal unit 355, and a symbol detector 360.

Signals from the AFE 205 are coupled to the second low-pass filter 310. The second low-pass filter 310 may limit energy of the signals from the AFE 205 to a desired frequency range and removes some quantization noise due to the ADC 250. In one embodiment, the frequency response of the second low-pass filter 310 may be described by (eq. 1).

$$H_{MA}(\omega) = \left[ e^{-j\frac{3}{2}\omega} \frac{\sin(2\omega)}{\sin(\omega)} \right]^4 \qquad (eq. 1)$$

This filter's zeros are at $\pi/2$, $\pi$ and $3\pi/2$ and, consequently, very little energy gets aliased onto the desired signal frequency range.

The output of the second low-pass filter 310 is coupled to the first down-sampler 315. The first down-sampler 315 decimates by four and, thus, in one embodiment, the resulting sampling rate is 16 MHz. The output of the first down-sampler 315 may be quantized to 9 bits/sample and is coupled to the third low-pass filter 320.

The third low-pass filter 320 receives data from the first down-sampler 315. The third low-pass filter 320 removes more quantization noise. In one embodiment, the impulse response of the third low-pass filter 320 may be that of an ideal low-pass filter with a cut-off frequency of $\pi/2$ multiplied by a window, such as a hamming window. The output of the third low-pass filter 320 is coupled to the second down-sampler 325.

The third low-pass filter 320 provides data to the second down-sampler 325, which decimates by two, thus in one embodiment, the sampling rate becomes 8 MHz. In one embodiment, the second down-sampler 325 may select (and pass) even data samples. In another embodiment, the second down-sampler 325 may select (and pass) odd data samples. The output of the second down-sampler 325 may be quantized to 13 bits/sample and is coupled to the adder 335 and the DC offset estimator 330. In one embodiment, the third down-sampler 325 may be combined with the second low-pass filter 320 such that low-pass filtered, down-sampled data may be produced by such a combined unit.

The DC offset estimator 330 examines the data from the second down-sampler 325 and estimates an included 0 Hz (DC) component. In one embodiment, a first order IIR filter may be used. There is a trade-off between accuracy of estimate and speed of convergence. As the filter bandwidth is increased, the filter's ability to track dc drift increases. However, estimation accuracy decreases as signal components other than DC start affecting the estimate. In one embodiment, a progressively decreasing bandwidth may be used. A high bandwidth filter may be used to quickly remove large dc offsets after a gain change in the beginning of the packet. Later in the packet, lower bandwidth filtering may be used to increase the accuracy of the estimate, which is important in the payload part of the packet. In one embodiment, this may be done by changing the a coefficient of the IIR filter. An exemplary IIR filter may be described by (eq. 2) below.

$$H_{DC-OFFSET}(z) = \frac{1/\alpha}{1-(1-1/\alpha)z^{-1}} \quad \alpha = 2^{4+DC\_ALPHA\_XXX} \quad \text{(eq. 2)}$$

In one embodiment, five parameters may control the IIR filter bandwidth: DC_ALPHA_TIMING, DC_ALPHA_GFSK, DC_ALPHA_1 MBIT, DC_ALPHA_2 MBIT, and DC_ALPHA_3 MBIT. For each parameter, the "XXX" text may be replaced by, for example, "GFSK," "1 MBIT," etc. In one embodiment, these parameters may be controlled by software. Initially, the bandwidth of DC-offset block may be set to the parameter DC_ALPHA_TIMING. In one embodiment, a small value for a may be used, thereby advantageously providing a fast convergence of the DC-offset estimate. If the automatic gain control (AGC) block commands a gain change, then the filter memory may be reset.

Once processing has begun on a Bluetooth packet, the header part of the packet may be processed with α set to DC_ALPHA_GFSK. Note that a may be set higher, but a set to DC_ALPHA_GFSK may allow for finer DC-offset estimates. The transition may be done without resetting the filter memory. In one embodiment, the payload of the packet may be processed with a set to one of the other three values depending on the packet type.

The estimated DC component provided by the DC offset estimator 330 is subtracted from the data provided by the second down-sampler 330 by the adder 335 producing a corrected IF signal. The output of the adder 335 is coupled to the second mixer 340. The second mixer 340 produces a baseband signal 341 by mixing the IF signal with a second frequency of approximately 500 KHz. In some embodiments, the second frequency may be 571 KHz or 421 KHz to compensate for frequency offsets between a transmitter and a receiver. The output of the second mixer 340 is coupled to the fourth low-pass filter 345.

The fourth low-pass filter 345 (e.g. a 25-tap linear-phase filter) may suppress high-pass interference even further. In one embodiment, the filter may be designed using a Parks-McClellan algorithm for a stop-band of 60 dB attenuation to suppress 40 dBr blockers at 3 MHz or farther away. In one embodiment, the output signal may have a sampling frequency of 8 MHz and dynamic range of 13 bits.

The output of the third low-pass filter 345 is coupled to the cordic processor 350. The cordic (COordinate Rotation DIgital Computer) processor 350 may transform the signal provided by the third low-pass filter 345 from rectangular coordinates to polar coordinates: (i.e., magnitude and phase). The amplitude of GFSK modulated signals may not contain any information. The phase of GFSK modulated signals may carry Bluetooth data symbols.

The output of the cordic processor 350 is coupled a carrier offset removal unit 355. Any residual carrier frequency offsets may be removed using a frequency estimator, which, in one embodiment, is a simple low-pass filter that estimates the mean of the differential phase (in other words, the mean of the frequency). The frequency estimate is subtracted from the instantaneous differential phase. An exemplary filter may calculate coefficients by using the following equation Any residual carrier frequency offsets are removed using a frequency estimator, which is a simple low-pass filter that estimates the mean of the differential phase (in other words, the mean of the frequency). The frequency estimate is subtracted from the instantaneous differential phase. An exemplary filter may calculate coefficients by using equation 3 (below):

$$H_{FREQ-OFFSET}(z) = \frac{1/\alpha}{1-(1-1/\alpha)z^{-1}} \quad \alpha = 2^{4+FREQ\_ALPHA\_XXX} \quad \text{(eq. 3)}$$

The α parameter may, in part, control filter bandwidth. Analogously to the DC-offset estimator design, the α parameter may initially be set to a relatively small value to facilitate fast convergence of the frequency offset estimate. Once processing has begun on a Bluetooth packet, a relatively larger value for α may be selected to improve the accuracy of the estimate.

The output of the carrier offset removal unit 355 is coupled to the symbol detector 360. In one embodiment, the symbol detector 360 may down-sample the phase signal provided by the carrier offset removal unit 355 to 1 MHz. The payload bits may be computed from the sign of a differential phase determined from the phase signal.

In one embodiment, the symbol detector 360 may consider the output of the carrier offset removal unit 355 representing neighboring data symbols to determine a current data symbol. For example, signal samples representing past, present and future sampling times may be examined. A present transmitted data symbol may correspond to a vector that most closely matches a vector determined by past, present and future signal samples.

As specified by the Bluetooth SIG, portions of EDR signals may be PSK modulated. Such signals may include a header portion and a payload portion. The header portion may be GFSK modulated while the payload portion may be PSK modulated. After the header is received, a receiver has approximately 4.75 us (i.e., the minimum guard interval length) to adapt to receive PSK signals. In one embodiment, the processing data-path for PSK and GFSK signals may be the same until after the digital rotator 340. The data-path after the digital rotator 340 may differ and some components may be reused.

Figure 4:
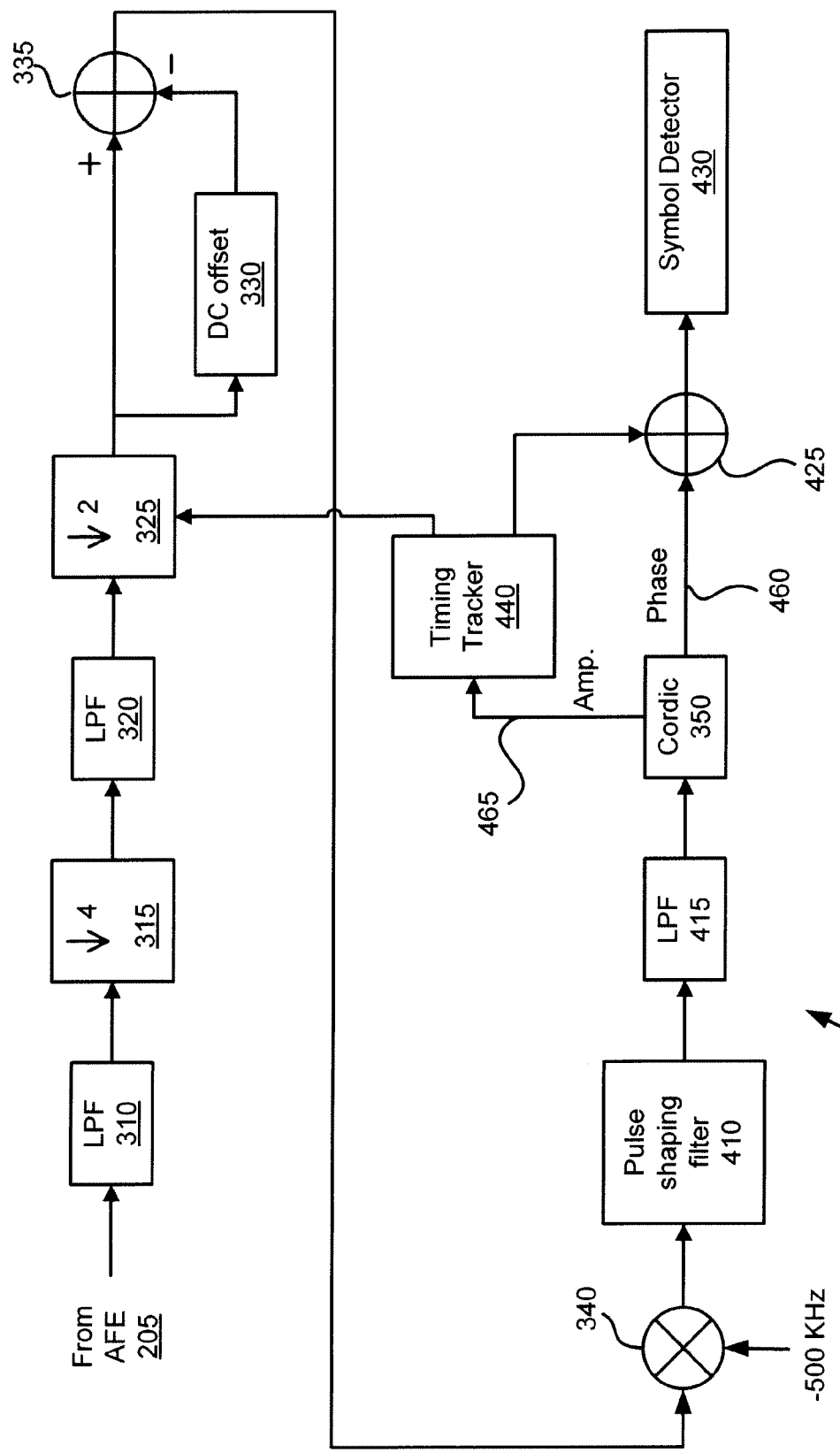

FIG. 4 is a block diagram of the signal processing unit 270 of FIG. 2 configured to process PSK modulated signals. In this configuration, the signal processing unit includes, without limitation, a second low-pass filter 310, a first down-sampler 315, a third low-pass filter 320, a second down-sampler 325, a DC offset estimator 330, an adder 335, a second mixer 340, a pulse shaping filter 410, a fifth low-pass filter 415, a cordic processor 350, a timing tracker 440, a phase adjuster 425 and a symbol detector 430.

As described herein, elements of the signal processing unit 270 may be commonly used to process GFSK or PSK modulated signals. Thus, the second low-pass filter 310, the first down-sampler 315, the third low-pass filter 320, the second down-sampler 325, the DC offset estimator 330, the adder 335, the second mixer 340 and the cordic processor 350 may function substantially similar as described in conjunction with FIG. 3. Thus, processing of the PSK modulated Bluetooth signals may be identical as described in FIG. 3 through the second mixer 340.

The output of the second mixer 340 is coupled to the pulse shaping filter 410. The pulse shaping filter 410 shapes the data pulse from the second mixer 340 to reduce inter-symbol interference. In one embodiment, the pulse shaping filter 410 may be a root-raised cosine filter. If a PSK transmitter includes a root-raised cosine filter in the transmit signal path, the result of a signal going through the root-raised cosine filter twice (once on the transmit side and once on the receive side) is that the signal has effectively gone through one raised cosine filter, which may introduce zero inter-symbol interference. The output of the pulse shaping filter 410 is coupled to the fifth low-pass filter 415. In one embodiment, the fifth low-pass filter 415 may provide more attenuation at a 2 MHz offset. The output of the fifth low-pass filter 415 is coupled to the cordic processor 350.

The cordic processor 350 transforms the output of the fifth low-pass filter 415 into polar coordinates (i.e., a phase signal 460 and an amplitude signal 465). The amplitude signal 465 is coupled to the timing tracker 440 and the phase signal 460 is coupled to the phase adjuster 425. In one embodiment, the phase adjuster 425 may be implemented with an adder. The output of the phase adjuster 425 is coupled to the symbol detector 430. The symbol detector 430 may determine the transmitted PSK symbols by, among other things, examining the differential phase of the phase signal 460 between transmitted symbols. In another embodiment, the symbol detector 430 may be implemented with a coherent detector. The coherent detector may use a $2^{nd}$ order digital phase-locked loop to track the phase signal 460 from the cordic processor 350 and decode the transmitted symbols.

The timing tracker 440 examines the amplitude signal 460. More particularly, the timing tracker 440 examines differences between amplitudes of the currently selected and adjacent sub-samples. In response to the differences, the timing tracker 440 may configure the second down-sampler 325 to change the timing of the data provided to the cordic processor 350. Additionally, the timing tracker 440 may also modify the phase signal through the phase adjuster 425.

The configuration of the hybrid zero-IF Bluetooth receiver 200 may advantageously reduce noise from flicker (1/f) contributions. Flicker noise, which may be relatively more prevalent in the analog domain, is relatively stronger near 0 Hz. Since the first mixer 230 produces an IF signal wherein only a relatively small portion of the IF signal (i.e. one band-edge of the spectrum of the IF signal) is near 0 Hz, noise contributions from flicker may be reduced.

Figure 1:
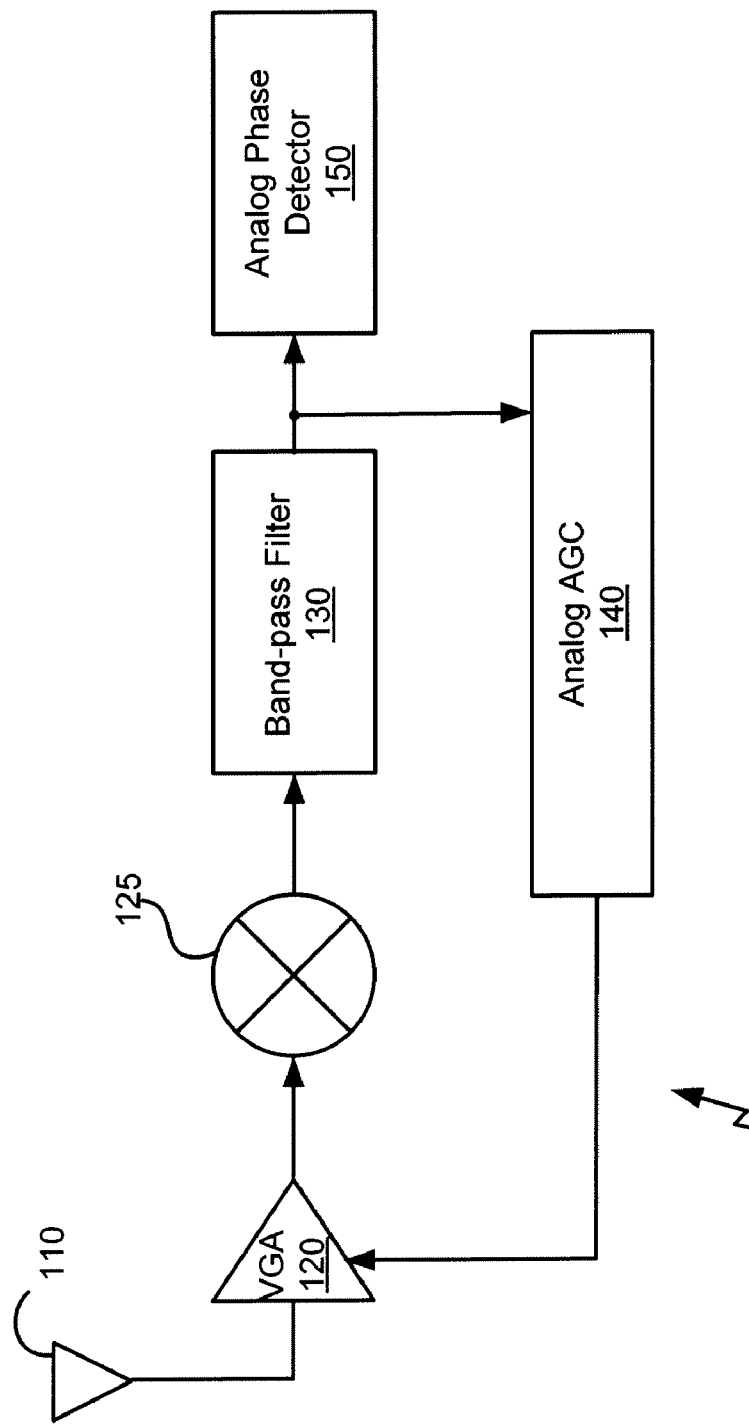
FIG. 1 is a block diagram of a prior art Bluetooth receiver.

Another advantage of the hybrid zero-IF Bluetooth receiver 200 is that the design of the first low-pass filter 240 may be relatively simple, especially compared to the band-pass filter 130 of a more traditional Bluetooth receiver design shown in FIG. 1. The first low-pass filter 240 may be implemented in relatively less area and with lower power dissipation than the band-pass filter 130 because of the relatively simpler design of the first low-pass filter 240. Also, since the first low-pass filter 240 may be implemented as an analog circuit, a simple design may ease design constraints and may be less prone to accept noise.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method for processing a Bluetooth signal, the method comprising:
receiving an RF signal;
mixing the RF signal with a first frequency to produce a first signal;
low-pass filtering the first signal to produce an intermediate frequency (IF) signal; and
processing the IF signal to recover transmitted symbols, wherein the processing includes:
digitizing the IF signal to produce a digital IF signal;
filtering the digital IF signal with a low-pass filter;
decimating the low-pass filtered digital IF signal to produce a decimated IF signal;
subtracting an estimated DC offset from the decimated IF signal to produce a corrected IF signal;
mixing the corrected IF signal with a second frequency to produce a baseband signal;
transforming the baseband signal to polar coordinates including amplitude and phase to produce a transformed baseband signal;
using differences of the amplitude of currently selected and adjacent sub-samples to change a timing of the baseband signal and modify the phase of the transformed baseband signal; and
recovering the transmitted symbols from the modified transformed baseband signal.

2. The method of claim 1, wherein the received RF signal is between 2401 and 2481 MHz.

3. The method of claim 1, wherein the received RF signal is between 2401 and 2481 MHz.

4. The method of claim 1, wherein the second frequency is 500 KHz.

5. The method of claim 1, wherein a frequency response of the low-pass filter is described by $$H_{MA}(\omega) = \left[ e^{-j\frac{3}{2}\omega} \frac{\sin(2\omega)}{\sin(\omega)} \right]^4.$$

6. The method of claim 1, wherein the IF signal is digitized with a ΣΔ ADC.

7. The method of claim 1, wherein the estimated DC offset is estimated with a configurable filter.

8. The method of claim 7, wherein the configurable filter has a response described by $$H(z) = \frac{1/\alpha}{1 - (1 - 1/\alpha)z^{-1}}$$

where α is a user selectable parameter.

9. The method of claim 8, wherein α is a programmable value.

10. A Bluetooth receiver comprising:
a first mixer configured to mix a received RF signal with a first frequency to produce a first signal;
a low-pass filter configured to filter the first signal and to produce a low-pass filtered first signal;
an ADC configured to sample the low-pass filtered first signal and to produce a digital IF signal;
a down-sampler configured to decimate the digital IF signal and to produce a decimated, digital IF signal;
a DC offset estimator configured to estimate a DC offset included in the decimated, digital IF signal;

an adder configured to subtract the estimated DC offset from the decimated, digital IF signal and to produce a corrected digital IF signal;

a second mixer configured to mix the corrected digital IF signal with a second frequency and to produce a baseband signal;

a cordic (COordinate Rotation DIgital Computer) processor configured to produce a phase signal from the baseband signal;

a phase adjuster configured to receive a phase output of the cordic processor;

a timing tracker configured to compare amplitude differences output by the cordic processor, change a timing of data generated by the down-sampler, and modify a phase signal through the phase adjuster; and a symbol detector configured to determine transmitted symbols in the baseband signal as transformed by the phase adjuster.

11. The receiver of claim 10, wherein the received RF signal is between 2401 and 2481 MHz.

12. The receiver of claim 10, wherein the second frequency is 500 KHz.

13. The receiver of claim 10, wherein the ADC is a $\Sigma\Delta$ ADC.

14. The receiver of claim 10, wherein the ADC samples I and Q components.

15. The receiver of claim 10, wherein the DC offset estimator is implemented with a configurable filter.

16. The receiver of claim 15, wherein the configurable filter has a response described by $$H(z) = \frac{1/\alpha}{1-(1-1/\alpha)z^{-1}}$$

wherein $\alpha$ is a user selectable parameter.

17. The method of claim 16, wherein $\alpha$ is a programmable value.

18. The receiver of claim 10, further comprising a pulse shaping filter configured to filter the baseband signal, the pulse shaping filter having a response that matches a root-raised cosine filter.

* * * * *